(12) United States Patent
Inoue et al.

(10) Patent No.: US 11,407,403 B2
(45) Date of Patent: Aug. 9, 2022

(54) VEHICLE CONTROL APPARATUS

(71) Applicant: SUBARU CORPORATION, Tokyo (JP)

(72) Inventors: Satoshi Inoue, Tokyo (JP); Tomoaki Sugiura, Tokyo (JP); Akihiro Nabeshima, Tokyo (JP); Takuya Machida, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 375 days.

(21) Appl. No.: 16/786,786

(22) Filed: Feb. 10, 2020

(65) Prior Publication Data

US 2020/0298829 A1 Sep. 24, 2020

(30) Foreign Application Priority Data

Mar. 20, 2019 (JP) .............................. JP2019-052796

(51) Int. Cl.
*B60W 20/30* (2016.01)
*B60W 10/107* (2012.01)
*B60W 10/02* (2006.01)

(52) U.S. Cl.
CPC ............ *B60W 20/30* (2013.01); *B60W 10/02* (2013.01); *B60W 10/107* (2013.01); *B60W 2510/244* (2013.01); *B60W 2510/246* (2013.01); *B60W 2520/10* (2013.01); *B60W 2710/1005* (2013.01)

(58) Field of Classification Search
CPC .... B60W 20/30; B60W 10/02; B60W 10/107; B60W 2510/244; B60W 2510/246; B60W 2520/10; B60W 2710/1005; B60W 10/06; B60W 10/08; B60W 20/10; B60W 10/101; B60W 10/103; B60W 10/105; B60W 10/108; B60W 10/109; B60W 2510/242; B60W 2510/248
USPC ........................................ 180/65.265; 475/5
See application file for complete search history.

(56) References Cited

U.S. PATENT DOCUMENTS

| 2017/0066437 A1* | 3/2017 | Yamamoto | B60T 1/10 |
| 2019/0031181 A1* | 1/2019 | David | B60W 10/108 |
| 2019/0143959 A1* | 5/2019 | Aoki | B60K 6/442 |
| | | | 701/22 |

(Continued)

FOREIGN PATENT DOCUMENTS

JP 2015-116936 A 6/2015

*Primary Examiner* — Roger L Pang
(74) *Attorney, Agent, or Firm* — McDermott Will & Emery LLP

(57) ABSTRACT

A vehicle control apparatus includes a controller that selects an electric vehicle (EV) mode where an output clutch is disengaged and a wheel is driven by a motor, or a hybrid electric vehicle (HEV) mode where the output clutch is engaged and the wheel is driven by an engine and the motor. The controller engages the output clutch during the EV mode to adjust a gear ratio of a continuously variable transmission, and switches, in accordance with a battery state, an adjustment mode for the gear ratio, during the EV mode, between a first adjustment mode that allows the gear ratio to be adjusted in accordance with a vehicle speed, and a second adjustment mode that allows the gear ratio to be adjusted to and kept at a reference gear ratio smaller than a lowest speed gear ratio regardless of the vehicle speed.

13 Claims, 6 Drawing Sheets

(56) References Cited

U.S. PATENT DOCUMENTS

2019/0359201 A1* 11/2019 Komuro ................ B60W 20/17
2020/0070808 A1* 3/2020 Ota ........................ F02N 11/04

* cited by examiner

# VEHICLE CONTROL APPARATUS

CROSS-REFERENCE TO RELATED APPLICATIONS

The present application claims priority from Japanese Patent Application No. 2019-052796 filed on Mar. 20, 2019, the entire contents of which are hereby incorporated by reference.

BACKGROUND

The disclosure relates to a vehicle control apparatus.

There have been vehicles mounted with an engine and a drive motor as drive sources. Such vehicles have been called hybrid electric vehicles or HEVs. As disclosed in Japanese Unexamined Patent Application Publication (JP-A) No. 2015-116936, for example, such a vehicle sometimes includes an engine, a continuously variable transmission coupled to an output shaft of the engine, a drive motor coupled to drive wheels, and an output clutch that allows and disallows transmission of power between an output shaft of the continuously variable transmission, and the drive wheels and the drive motor.

SUMMARY

An aspect of the disclosure provides a vehicle control apparatus configured to control a vehicle provided with an engine including a first output shaft, a continuously variable transmission coupled to the first output shaft of the engine and including a second output shaft, a drive motor coupled to a drive wheel, an output clutch configured to allow and disallow transmission of power between the second output shaft of the continuously variable transmission, and the drive wheel and the drive motor, and a battery configured to store electric power to be supplied to the drive motor. The vehicle control apparatus includes a controller configured to switch and execute either of an electric vehicle (EV) travel mode that allows, in a state where the output clutch is disengaged, power outputted from the drive motor to drive the drive wheel, and a hybrid electric vehicle (HEV) travel mode that allows, in a state where the output clutch is engaged, both power outputted from the engine and the power outputted from the drive motor to drive the drive wheel. The controller is configured to engage the output clutch during the execution of the EV travel mode to adjust a gear ratio of the continuously variable transmission. The controller is configured to switch, during the execution of the EV travel mode, an adjustment mode for the gear ratio in accordance with a state of the battery between a first adjustment mode that allows the gear ratio to be adjusted in accordance with a vehicle speed of the vehicle, and a second adjustment mode that allows the gear ratio to be adjusted to a reference gear ratio smaller than a lowest speed gear ratio to keep the gear ratio at the reference gear ratio regardless of the vehicle speed.

An aspect of the disclosure provides a vehicle control apparatus configured to control a vehicle provided with an engine including a first output shaft, a continuously variable transmission coupled to the first output shaft of the engine and including a second output shaft, a drive motor coupled to a drive wheel, an output clutch configured to allow and disallow transmission of power between the second output shaft of the continuously variable transmission, and the drive wheel and the drive motor, and a battery configured to store electric power to be supplied to the drive motor. The vehicle control apparatus includes circuitry configured to switch and execute either of an electric vehicle (EV) travel mode that allows, in a state where the output clutch is disengaged, power outputted from the drive motor to drive the drive wheel, and a hybrid electric vehicle (HEV) travel mode that allows, in a state where the output clutch is engaged, both power outputted from the engine and the power outputted from the drive motor to drive the drive wheel. The circuitry is configured to engage the output clutch during the execution of the EV travel mode to adjust a gear ratio of the continuously variable transmission. The circuitry is configured to switch, during the execution of the EV travel mode, an adjustment mode for the gear ratio in accordance with a state of the battery between a first adjustment mode that allows the gear ratio to be adjusted in accordance with a vehicle speed of the vehicle, and a second adjustment mode that allows the gear ratio to be adjusted to a reference gear ratio smaller than a lowest speed gear ratio to keep the gear ratio at the reference gear ratio regardless of the vehicle speed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
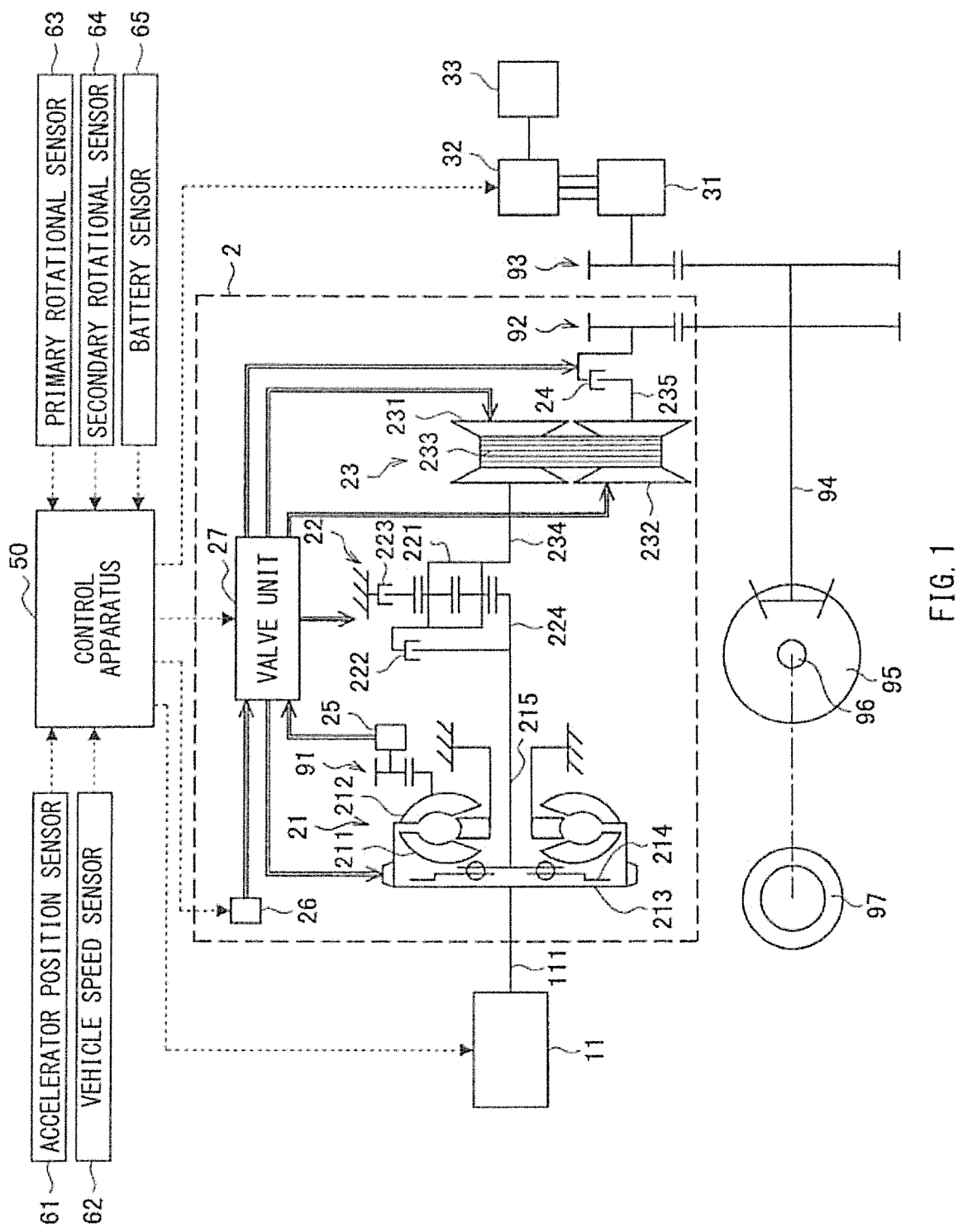
FIG. 1 is a schematic view illustrating an outline configuration of a power transmission system of a vehicle mounted with a vehicle control apparatus according to one example embodiment of the disclosure.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

In the vehicle including the output clutch disclosed in JP-A No. 2015-116936 described above, it is possible to switch and execute either of an EV travel mode that allows, in a state where the output clutch is disengaged, power outputted from the drive motor to drive the drive wheels, and an HEV travel mode that allows, in a state where the output clutch is engaged, power outputted from the engine and the drive motor to drive the drive wheels. Upon disengagement of the output clutch during execution of the EV travel mode, no power is transmitted between the drive wheels, and the continuously variable transmission and the engine, making it possible to decrease an energy loss due to that the continuously variable transmission and the engine are both rotated.

It is conceivable that, during execution of the EV travel mode described above, no change in speed of power by the continuously variable transmission takes place, but an adjustment of a gear ratio of the continuously variable transmission takes place. For example, in a case where the vehicle re-starts with power outputted from the engine after the vehicle has come to a halt in a state where the gear ratio is too close to a high speed side, or in a case where the vehicle re-accelerates with power outputted from the engine after the travel mode has been switched to the HEV travel mode in a state where the gear ratio is too close to the high speed side in a case where a vehicle speed is relatively low, there can be a decrease in ease of start or in acceleration due to a lack of power to be transmitted to the drive wheels. For example, in a case where the travel mode is to be switched to the HEV travel mode in a state where the gear ratio is too close to a low speed side in a case where the vehicle speed is relatively high, there can be over rotation where a speed of a primary shaft of the continuously variable transmission becomes excessive. It is conceivable that, to address the issues described above, the gear ratio of the continuously variable transmission is adjusted in accordance with the vehicle speed during execution of the EV travel mode.

The output clutch is basically disengaged during execution of the EV travel mode described above. The primary shaft and a secondary shaft of the continuously variable transmission are thus stopped from rotating. In an adjustment of the gear ratio, it is thus necessary to engage the output clutch, leading to an energy loss due to that at least the continuously variable transmission is rotated. Accordingly, the higher the frequency of adjusting the gear ratio, the greater the decrease in energy efficiency, i.e., fuel consumption and electric power consumption.

The disclosure provides a novel, improved vehicle control apparatus that is able to appropriately suppress a decrease in energy efficiency due to an adjustment of a gear ratio of the continuously variable transmission during execution of the EV travel mode.

1. CONFIGURATION OF POWER TRANSMISSION SYSTEM

Figure 2:
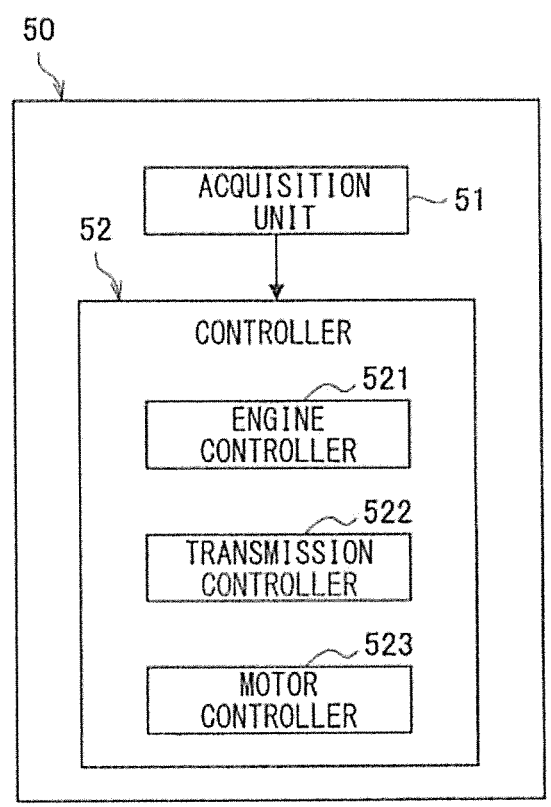
FIG. 2 is a block diagram illustrating an example of a configuration of the vehicle control apparatus illustrated in FIG. 1.

With reference to FIGS. 1 and 2, a configuration of a power transmission system 1 of a vehicle mounted with a control apparatus 50 according to an example embodiment of the disclosure will now be described below.

FIG. 1 is a schematic view illustrating an outline configuration of the power transmission system 1. FIG. 2 is a block diagram illustrating an example of a configuration of the control apparatus 50.

The power transmission system 1 may be mounted in the vehicle. As illustrated in FIG. 1, the power transmission system 1 may include an engine 11, a continuously variable transmission (CVT) 23, a drive motor 31, an output clutch 24, and a battery 33. The engine 11 includes a crank shaft 111 serving as an output shaft. The CVT 23 includes a secondary shaft 235 serving as an output shaft coupled to the crank shaft 111. The drive motor 31 is coupled to drive wheels 97. The output clutch 24 may allow and disallow power to be transmitted between the secondary shaft 235, and the drive wheels 97 and the drive motor 31. The battery 33 stores electric power to be supplied to the drive motor 31. In one embodiment, the CVT 23 may serve as a "continuously variable transmission".

In a specific but non-limiting example, the engine 11 may be coupled to the drive wheels 97 via an automatic transmission 2 including the CVT 23 in the power transmission system 1. In the automatic transmission 2, a torque converter 21, a forward-backward switching mechanism 22, the CVT 23, and the output clutch 24 may be sequentially coupled to each other in order from the engine 11. Power outputted from the engine 11 may be transmitted to the forward-backward switching mechanism 22 via the torque converter 21. A rotational direction of the power may be switched to a forward direction or a backward direction by the forward-backward switching mechanism 22. The power may thus be transmitted to the CVT 23. The power transmitted to the CVT 23 may be changed in speed by the CVT 23. The power may then be outputted toward the drive wheels 97. The power outputted from the CVT 23 may be transmitted to the drive wheels 97 via the output clutch 24, a drive shaft 94, a differential gear 95, and an axle 96.

The engine 11 may be an internal combustion engine that uses gasoline, for example, as fuel to generate power. The engine 11 may include the crank shaft 111. The crank shaft 111 may serve as the output shaft of the engine 11. The crank shaft 111 may be coupled to the torque converter 21.

The torque converter 21 may include a pump impeller 212 and a turbine runner 211. The pump impeller 212 may be coupled to the crank shaft 111 of the engine 11 via a front cover 213. The turbine runner 211 may face the pump impeller 212. The turbine runner 211 may be coupled to a turbine shaft 215. Hydraulic oil may be supplied in the torque converter 21. Via the hydraulic oil, power outputted from the engine 11 may be transmitted from the pump impeller 212 to the turbine runner 211. A lock-up clutch 214 may be provided in the torque converter 21. The lock-up clutch 214 may be configured to directly couple the crank shaft 111 of the engine 11 and the turbine shaft 215. The turbine shaft 215 may be coupled to the forward-backward switching mechanism 22.

In a case where the lock-up clutch 214 is disengaged, i.e., in a case where a lock-up state of the torque converter 21 is canceled, power outputted from the engine 11 may be transmitted to the forward-backward switching mechanism 22 via the hydraulic oil. On the other hand, in a case where the lock-up clutch 214 is engaged, i.e., in a case where the torque converter 21 is in the lock-up state, power outputted from the engine 11 may be directly transmitted to the forward-backward switching mechanism 22.

To the pump impeller 212 may be coupled a mechanical oil pump 25 via a gear train 91. The mechanical oil pump 25 may be driven as the crank shaft 111 of the engine 11 rotates. The mechanical oil pump 25 may thus generate hydraulic pressure to be supplied to a valve unit 27 provided in the automatic transmission 2. The valve unit 27 may be coupled to the torque converter 21, the forward-backward switching mechanism 22, the CVT 23, and the output clutch 24 via oil paths. It is possible in the valve unit 27 to adjust hydraulic pressure to be supplied to the devices. The valve unit 27 may be provided with control valves. The control valves may control hydraulic pressure to be supplied to the devices. In a specific but non-limiting example, the control valves may be proportional electromagnetic control valves.

It is also possible in the automatic transmission 2 to use an electric oil pump 26 to generate hydraulic pressure to be supplied to the valve unit 27. In a specific but non-limiting example, the electric oil pump 26 may include a motor. The motor may drive the electric oil pump 26.

The forward-backward switching mechanism 22 may include a planetary gear 221, a forward clutch 222, and a backward brake 223. The forward-backward switching mechanism 22 may be coupled to a primary shaft 234 of the CVT 23. It is possible in the forward-backward switching mechanism 22 to switch a rotational direction of the primary shaft 234 of the CVT 23 in accordance with engagement states of the forward clutch 222 and the backward brake 223. In a case where the forward clutch 222 is engaged and the backward brake 223 is disengaged, an input shaft 224 coupled to the turbine shaft 215 may be directly coupled to the primary shaft 234, rotating the primary shaft 234 in a normal direction. This makes it possible to allow the vehicle to travel forward. In a case where the forward clutch 222 is disengaged and the backward brake 223 is engaged, the input shaft 224 may be coupled to the primary shaft 234 via the planetary gear 221, rotating the primary shaft 234 in a reverse direction. This makes it possible to allow the vehicle to travel backward.

In a case where the forward clutch 222 and the backward brake 223 are both disengaged, such a state may be attained that no power is transmitted from the engine 11 to the primary shaft 234. In a case where either of the forward clutch 222 and the backward brake 223 is engaged, as described above, such a state may be attained that power is transmitted from the engine 11 to the primary shaft 234. It is therefore possible in the forward-backward switching mechanism 22 to allow and disallow power to be transmitted between the engine 11 and the CVT 23.

The state where the forward clutch 222 and the backward brake 223 are both disengaged may correspond to a state where the forward-backward switching mechanism 22 is disengaged. The state where either of the forward clutch 222 and the backward brake 223 is engaged may correspond to a state where the forward-backward switching mechanism 22 is engaged.

The CVT 23 may include a primary pulley 231, a secondary pulley 232, a chain 233, the primary shaft 234, and the secondary shaft 235. The primary shaft 234 may serve as an input shaft that receives power. The secondary shaft 235 may serve as the output shaft that outputs power. The primary shaft 234 and the secondary shaft 235 may be arranged in parallel with each other. The primary pulley 231 may be secured to the primary shaft 234. The secondary pulley 232 may be secured to the secondary shaft 235. The primary pulley 231 and the secondary pulley 232 may be wound with the chain 233. The chain 233 may transmit power between the primary pulley 231 and the secondary pulley 232. Each of the pulleys may be provided with a fixed sheave and a movable sheave. The fixed sheave and the movable sheave may pinch the chain 233.

Hydraulic pressure to be supplied to each of the pulleys may push the movable sheave toward the fixed sheave, pinching the chain 233. As hydraulic pressure to be supplied to the pulleys is adjusted, pressure at which the chain 233 is pinched by the pulleys may be adjusted. This makes it possible to adjust a radius at which the chain 233 is wound onto each of the pulleys. This makes it possible to adjust a gear ratio of the CVT 23. The CVT 23 may change in speed power inputted to the primary shaft 234 at the gear ratio adjusted as described above. The CVT 23 may then output the changed power to the secondary shaft 235. The secondary shaft 235 may be coupled to the drive shaft 94 via the output clutch 24 and a gear train 92. The drive shaft 94 may be coupled to the drive motor 31 via a gear train 93.

In a specific but non-limiting example, the output clutch 24 may allow and disallow power to be transmitted between the secondary shaft 235 and the drive shaft 94. In a specific but non-limiting example, the output clutch 24 may be a friction clutch. In a case where the output clutch 24 is engaged, power may be transmitted between the secondary shaft 235 and the drive shaft 94. On the other hand, in a case where the output clutch 24 is disengaged, no power may be transmitted between the secondary shaft 235 and the drive shaft 94.

In a specific but non-limiting example, the drive motor 31 may be a multi-phase alternating current motor, such as a three-phase alternating current motor. The drive motor 31 may be coupled to the battery 33 via an inverter 32. The drive motor 31 may be configured to generate power when driven with electric power of the battery 33. In other words, the drive motor 31 may be power-driven. Power outputted from the drive motor 31 may be transmitted to the drive shaft 94 via the gear train 93. The drive motor 31 may serve as a generator that is driven in a regenerative manner during deceleration of the vehicle to generate electric power with kinetic energy of the drive wheels 97. Electric power generated by the drive motor 31 as described above may be supplied to the battery 33 via the inverter 32. The electric power may thus be used to charge the battery 33.

The drive shaft 94 may be coupled to the drive wheels 97 via the differential gear 95 and the axle 96. Power outputted from the drive motor 31 and transmitted to the drive shaft 94 and power outputted from the engine 11 and transmitted to the drive shaft 94 via the output clutch 24 may be distributed by the differential gear 95 and transmitted to the drive wheels 97 on left and right sides via the axle 96. The drive wheels 97 may be front wheels or rear wheels. The drive shaft 94 may be coupled to a propeller shaft. The propeller shaft is not illustrated. In such a case, power transmitted to the drive shaft 94 may be transmitted to all of the front wheels and the rear wheels.

The power transmission system 1 may be provided with various kinds of sensors. In a specific but non-limiting example, the power transmission system 1 may include an accelerator position sensor 61, a vehicle speed sensor 62, a primary rotational sensor 63, a secondary rotational sensor 64, and a battery sensor 65.

The accelerator position sensor 61 may detect an accelerator position corresponding to how much an accelerator pedal is operated by a driver, and may then output a result of detection.

The vehicle speed sensor 62 may detect a vehicle speed indicative of a speed of the vehicle, and may then output a result of detection.

The primary rotational sensor 63 may detect a speed of the primary shaft 234, and may then output a result of detection.

The secondary rotational sensor 64 may detect a speed of the secondary shaft 235, and may then output a result of detection.

The battery sensor 65 may detect various kinds of state quantities of the battery 33. In a specific but non-limiting example, the battery sensor 65 may detect, as state quantities of the battery 33, a remaining capacity and a temperature of the battery 33. The remaining capacity may also be referred to as state of charge (SOC).

The control apparatus 50 may control operation of the devices in the power transmission system 1.

In a specific but non-limiting example, the control apparatus 50 may include, for example, circuitry including a central processing unit (CPU), a read only memory (ROM), and a random access memory (RAM). The CPU may be an arithmetic processing unit. The ROM may be a storage element that stores programs and arithmetic parameters, for example, used by the CPU. The RAM may be a storage element that temporarily stores parameters, for example, that appropriately change during execution by the CPU.

The control apparatus 50 may communicate with the devices in the power transmission system 1. Communications between the control apparatus 50 and the devices may be achieved by using, for example, controller area network (CAN) communications. For example, the control apparatus 50 may communicate with the engine 11, the electric oil pump 26, the valve unit 27, the inverter 32, and the sensors in the power transmission system 1.

The operations of the control apparatus 50 may be divided to be achieved by a plurality of control apparatuses. In such a case, the plurality of control apparatuses may be coupled to each other via a communication bus such as a CAN. For example, operations of the control apparatus 50, regarding control of the engine 11, control of the automatic transmission 2, and control of the drive motor 31, may be divided and respectively achieved by control apparatuses different from each other.

The control apparatus 50 may include an acquisition unit 51 and a controller 52, as illustrated in FIG. 2, for example.

The acquisition unit 51 may acquire various kinds of information used in processes performed by the control apparatus 50. The acquisition unit 51 may then output the acquired information to the controller 52. For example, the acquisition unit 51 may communicate with the sensors in the power transmission system 1 to acquire results of detection outputted by the sensors.

The controller 52 may use the information acquired by the acquisition unit 51 to execute the processes. In a specific but non-limiting example, the controller 52 may control operation of each of the engine 11, the automatic transmission 2, and the drive motor 31, in accordance with a travel state of the vehicle.

The controller 52 may include an engine controller 521, a transmission controller 522, and a motor controller 523, for example.

The engine controller 521 may control operation of the engine 11. In a specific but non-limiting example, the engine controller 521 may control operation of the devices in the engine 11 to control throttle positions, ignition timings, and fuel injection amounts, for example. This therefore makes it possible to control output of the engine 11.

The transmission controller 522 may control operation of the devices in the automatic transmission 2. In a specific but non-limiting example, the transmission controller 522 may control operation of the valve unit 27 to control operation of the torque converter 21, the forward-backward switching mechanism 22, the CVT 23, and the output clutch 24. This therefore makes it possible to respectively control an engagement state of the lock-up clutch 214 of the torque converter 21, an engagement state of the forward-backward switching mechanism 22, the gear ratio of the CVT 23, and an engagement state of the output clutch 24. In a specific but non-limiting example, control of the gear ratio of the CVT 23 by the transmission controller 522 may be achieved by using a result of detection of the speed of the primary shaft 234 and the speed of the secondary shaft 235. The transmission controller 522 may control operation of the motor of the electric oil pump 26 to control driving of the electric oil pump 26.

The motor controller 523 may control operation of the drive motor 31. In a specific but non-limiting example, the motor controller 523 may control operation of the inverter 32 to control supplying of electric power between the drive motor 31 and the battery 33. This therefore makes it possible to control generation of power and electric power by the drive motor 31.

The controller 52 may control operation of the engine 11, the automatic transmission 2, and the drive motor 31, as described above, making it possible to switch and execute, as a travel mode of the vehicle, an EV travel mode and an HEV travel mode. The EV travel mode may be a travel mode where, in a state where the output clutch 24 is disengaged, the drive wheels 97 are driven with power outputted from the drive motor 31. The HEV travel mode may be a travel mode where, in a state where the output clutch 24 is engaged, the drive wheels 97 are driven with power outputted from the engine 11 and the drive motor 31.

With the control apparatus 50 according to the example embodiment, the controller 52 may perform control regarding an adjustment of the gear ratio of the CVT 23 during execution of the EV travel mode. This makes it possible to appropriately suppress a decrease in energy efficiency due to an adjustment of the gear ratio of the CVT 23 during the EV travel mode. Such control regarding an adjustment of the gear ratio of the CVT 23 during execution of the EV travel mode will be described below in detail.

2. OPERATION OF CONTROL APPARATUS

Next, operation of the control apparatus 50 according to the example embodiment of the disclosure will be described below with reference to FIGS. 3 to 6.

2-1. Control Regarding Switching of Travel Mode

Control regarding how the control apparatus 50 switches the travel mode will first be described below with reference to FIGS. 3 and 4.

As described above, it is possible in the controller 52 to switch and execute either of the EV travel mode and the HEV travel mode, as the travel mode of the vehicle.

In a specific but non-limiting example, the controller 52 may switch the travel mode of the vehicle on the basis of a requested driving force indicative of a value at which power to be transmitted to the drive wheels 97 is requested. For example, the controller 52 may switch the travel mode of the vehicle to the HEV travel mode in a case where a requested driving force is greater than a reference driving force. On the other hand, the controller 52 may switch the travel mode of the vehicle to the EV travel mode in a case where a requested driving force is equal to or below the reference driving force. The reference driving force may be set to a value smaller than a maximum value at which the drive motor 31 is able to transmit power to the drive wheels 97. In terms of improving electric power consumption, for example, the reference driving force may be set in accordance with specifications and other features of the drive motor 31. It is possible in the controller 52 to calculate a requested driving force on the basis of the accelerator position and the vehicle speed, for example.

Figure 3:
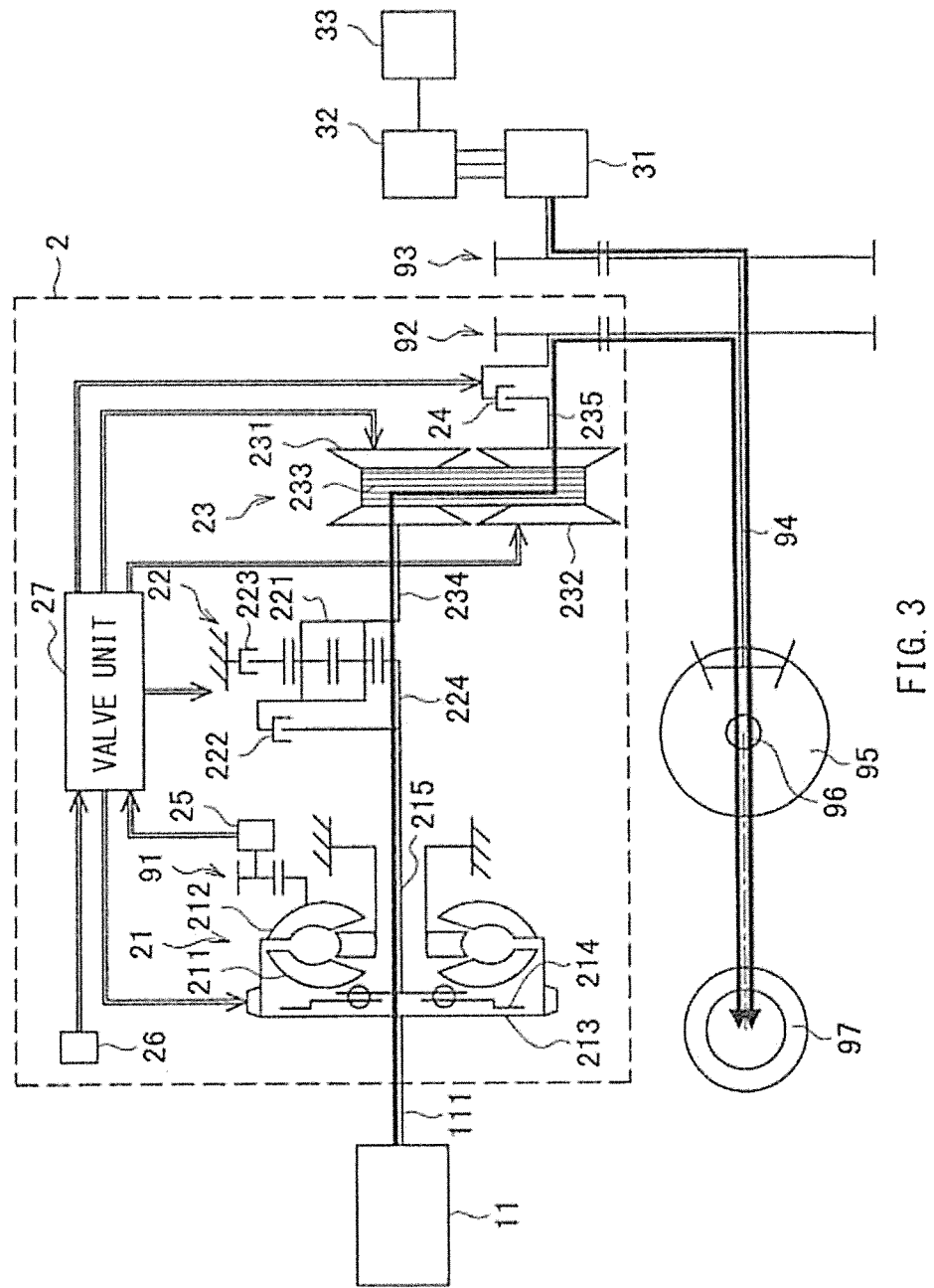
FIG. 3 is a schematic view illustrating a power transmission state during the HEV travel mode in the power transmission system of the vehicle illustrated in FIG. 1.

FIG. 3 is a schematic view illustrating a power transmission state during execution of the HEV travel mode in the power transmission system 1. In FIGS. 3 and 4 described below, power transmission routes are indicated by bold arrows.

In the HEV travel mode, the transmission controller 522 of the controller 52 may engage the forward-backward switching mechanism 22 and the output clutch 24. The engine controller 521 and the motor controller 523 of the controller 52 may cooperate with each other and may control output of each of the engine 11 and the drive motor 31 to allow power to be transmitted to the drive wheels 97 to satisfy a requested driving force. As illustrated in FIG. 3, this makes it possible to allow power outputted from the engine 11 to be transmitted to the drive wheels 97 via the CVT 23, as well as to allow power outputted from the drive motor 31 to be transmitted to the drive wheels 97. As described above, in the HEV travel mode, the drive wheels 97 may be driven with power outputted from the engine 11 and the drive motor 31 in a state where the output clutch 24 is engaged.

The transmission controller 522 of the controller 52 may determine a target gear ratio indicative of a target value of the gear ratio on the basis of the vehicle speed and the accelerator position during execution of the HEV travel mode to control and make the gear ratio of the CVT 23 close to the target gear ratio.

Figure 4:
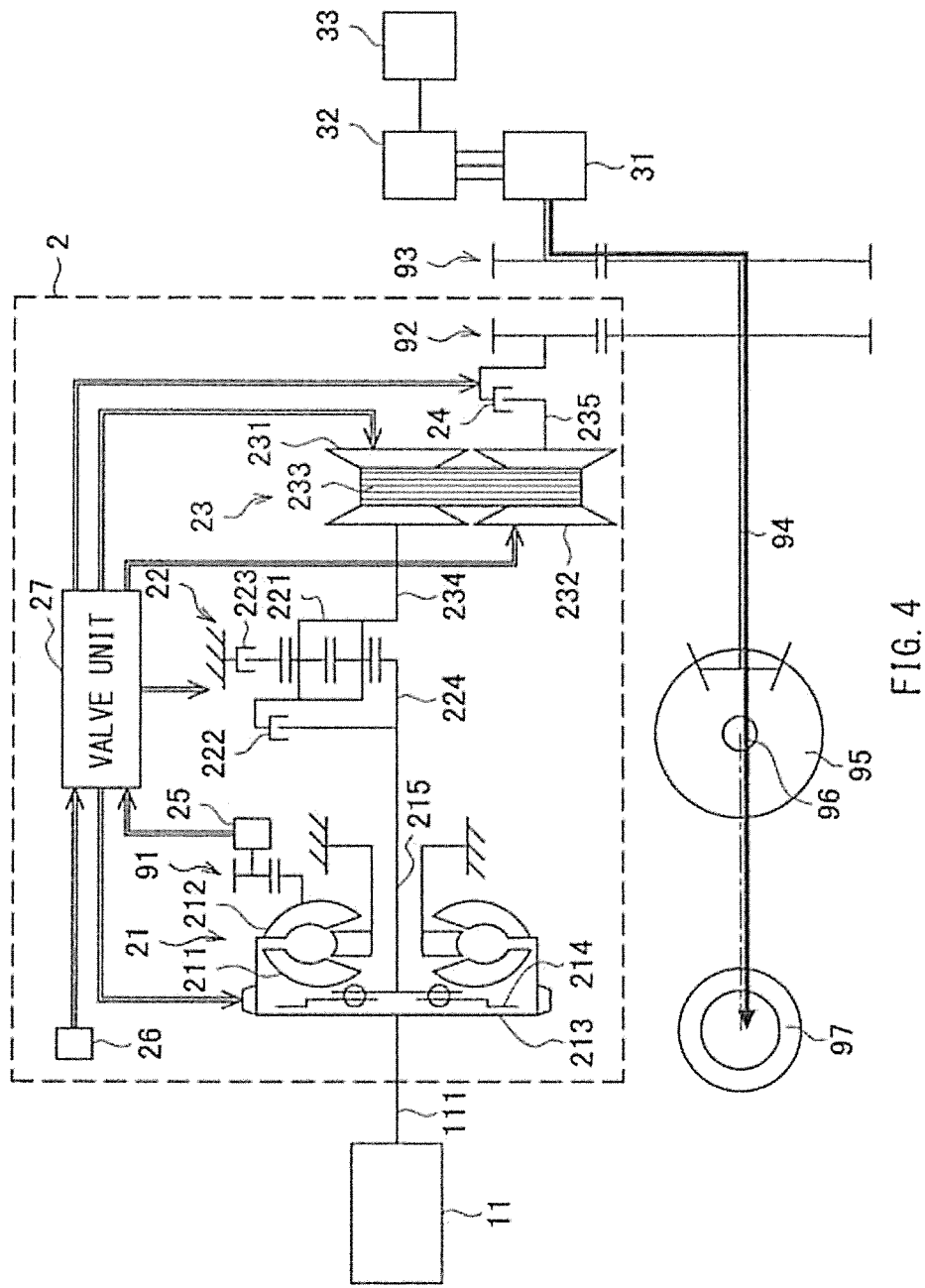
FIG. 4 is a schematic view illustrating a power transmission state during the EV travel mode in the power transmission system of the vehicle illustrated in FIG. 1.

FIG. 4 is a schematic view illustrating a power transmission state during execution of the EV travel mode in the power transmission system 1.

In the EV travel mode, the transmission controller 522 of the controller 52 may basically disengage the forward-backward switching mechanism 22 and the output clutch 24. The engine controller 521 of the controller 52 may stop the engine 11. The motor controller 523 may control output of the drive motor 31 to allow power to be transmitted to the drive wheels 97 to satisfy a requested driving force. As illustrated in FIG. 4, this makes it possible to allow power outputted from the drive motor 31 to be transmitted to the drive wheels 97 in a state where the engine 11 is stopped. As described above, in the EV travel mode, the drive wheels 97 may be driven with power outputted from the drive motor 31 in a state where the output clutch 24 is disengaged. With the output clutch 24 being disengaged during execution of the EV travel mode, it is possible to decrease an energy loss due to that the CVT 23 and the engine 11 are both rotated.

As the engine 11 is stopped during execution of the EV travel mode, the mechanical oil pump 25 may also be stopped. The transmission controller 522 of the controller 52 may therefore drive the electric oil pump 26 to generate hydraulic pressure to be supplied to the valve unit 27. This makes it possible to control operation of the devices in the automatic transmission 2.

The transmission controller 522 of the controller 52 may engage the output clutch 24 to adjust the gear ratio of the CVT 23 during execution of the EV travel mode. By engaging the output clutch 24 in an adjustment of the gear ratio during execution of the EV travel mode, it is possible to appropriately adjust the gear ratio by using a result of detection of the speed of the primary shaft 234 and the speed of the secondary shaft 235. The transmission controller 522 switches the adjustment mode for the gear ratio in accordance with a state of the battery 33 between a first adjustment mode and a second adjustment mode. The first adjustment mode may allow the gear ratio of the CVT 23 to be adjusted in accordance with the vehicle speed. The second adjustment mode may allow the gear ratio of the CVT 23 to be adjusted to a reference gear ratio smaller than a lowest speed gear ratio. The second adjustment mode may then keep the gear ratio of the CVT 23 at the reference gear ratio regardless of the vehicle speed.

2-2. Control Regarding Adjustment of Gear Ratio During Execution of EV Travel Mode Next, how the control apparatus 50 performs control regarding an adjustment of the gear ratio of the CVT 23 during execution of the EV travel mode will be described below with reference to FIGS. 5 and 6.

Figure 5:
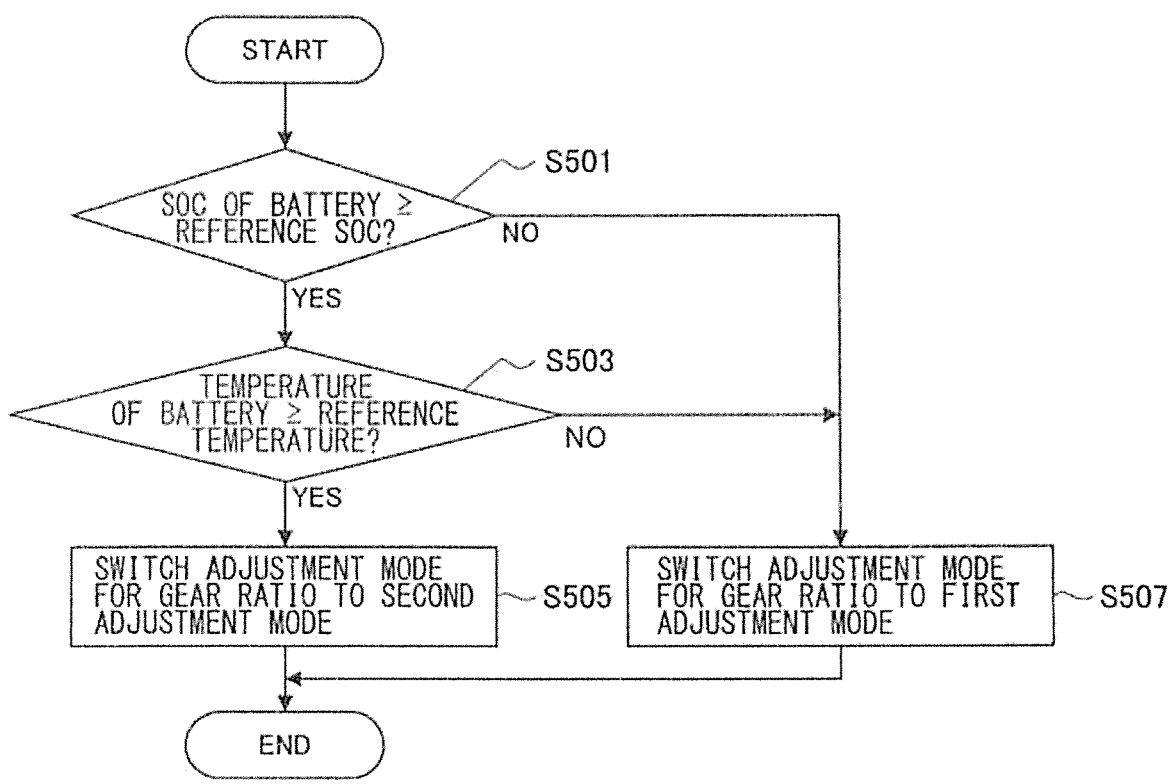
FIG. 5 is a flowchart illustrating an example of a flow of processes performed by the vehicle control apparatus illustrated in FIG. 1.

FIG. 5 is a flowchart illustrating an example of a flow of processes performed by the control apparatus 50. In a specific but non-limiting example, a control flow illustrated in FIG. 5 may be repeatedly executed during execution of the EV travel mode.

Upon start of the control flow illustrated in FIG. 5, the controller 52 may first determine whether the SOC of the battery 33 is equal to or above a reference SOC at step S501. In a case where it is determined that the SOC of the battery 33 is equal to or above the reference SOC (YES at step S501), the control flow may proceed to step S503. In a case where it is determined that the SOC of the battery 33 is below the reference SOC (NO at step S501), the control flow may proceed to step S507.

In a case where YES is determined at steps S501 and S503, the second adjustment mode may be executed. The second adjustment mode may allow the gear ratio to be adjusted to and kept at the reference gear ratio regardless of the vehicle speed, as will be described below. In the second adjustment mode, the gear ratio may be adjusted to the reference gear ratio smaller than the lowest speed gear ratio, as will be described below. It is requested that, in a case where the vehicle re-starts or re-accelerates with power outputted from the engine 11, the battery 33 exerts a maximum allowable discharge electric power, i.e., an electric power amount at which the battery 33 is able to discharge electricity per unit time, large enough for the output of the drive motor 31 to be secured to prevent a lack of power to be transmitted to the drive wheels 97. The maximum allowable discharge electric power of the battery 33 may lower as the SOC of the battery 33 lowers. The reference SOC may thus be set to a value allowing a determination of whether the maximum allowable discharge electric power of the battery 33 satisfies power requested in the second adjustment mode, for example.

In a case where YES is determined at step S501, the controller 52 may determine whether the temperature of the battery 33 is equal to or above a reference temperature at step S503. In a case where it is determined that the temperature of the battery 33 is equal to or above the reference temperature (YES at step S503), the control flow may proceed to step S505. In a case where it is determined that the temperature of the battery 33 is below the reference temperature (NO at step S503), the control flow may proceed to step S507.

In a case where YES is determined at steps S501 and S503, the second adjustment mode may be executed. The second adjustment mode may allow the gear ratio to be adjusted to and kept at the reference gear ratio regardless of the vehicle speed, as described above. The maximum allowable discharge electric power of the battery 33 may lower as the temperature of the battery 33 lowers. The reference temperature may thus be set to a value allowing a determination of whether the maximum allowable discharge electric power of the battery 33 satisfies power requested in the second adjustment mode, for example.

In a case where NO is determined at step S501 or S503, the transmission controller 522 of the controller 52 may switch the adjustment mode for the gear ratio of the CVT 23 to the first adjustment mode at step S507.

In the first adjustment mode, the transmission controller 522 may adjust the gear ratio of the CVT 23 in accordance with the vehicle speed. The first adjustment mode may correspond to an adjustment mode that suppresses a decrease in ease of start when the vehicle re-starts or in acceleration when the vehicle re-accelerates with power outputted from the engine 11, and suppresses over rotation of the primary shaft 234 in a case where the maximum allowable discharge electric power of the battery 33 is relatively small.

In terms of more appropriately suppressing a decrease in ease of start when the vehicle re-starts or in acceleration when the vehicle re-accelerates with power outputted from the engine 11, as well as of more appropriately suppressing over rotation of the primary shaft 234, the transmission controller 522 may adjust, during the first adjustment mode, the gear ratio to the lowest speed gear ratio in a case where the vehicle speed has lowered below a first threshold, and adjust the gear ratio to a high speed side gear ratio in a case where the vehicle speed has exceeded a second threshold greater than the first threshold.

Figure 6:
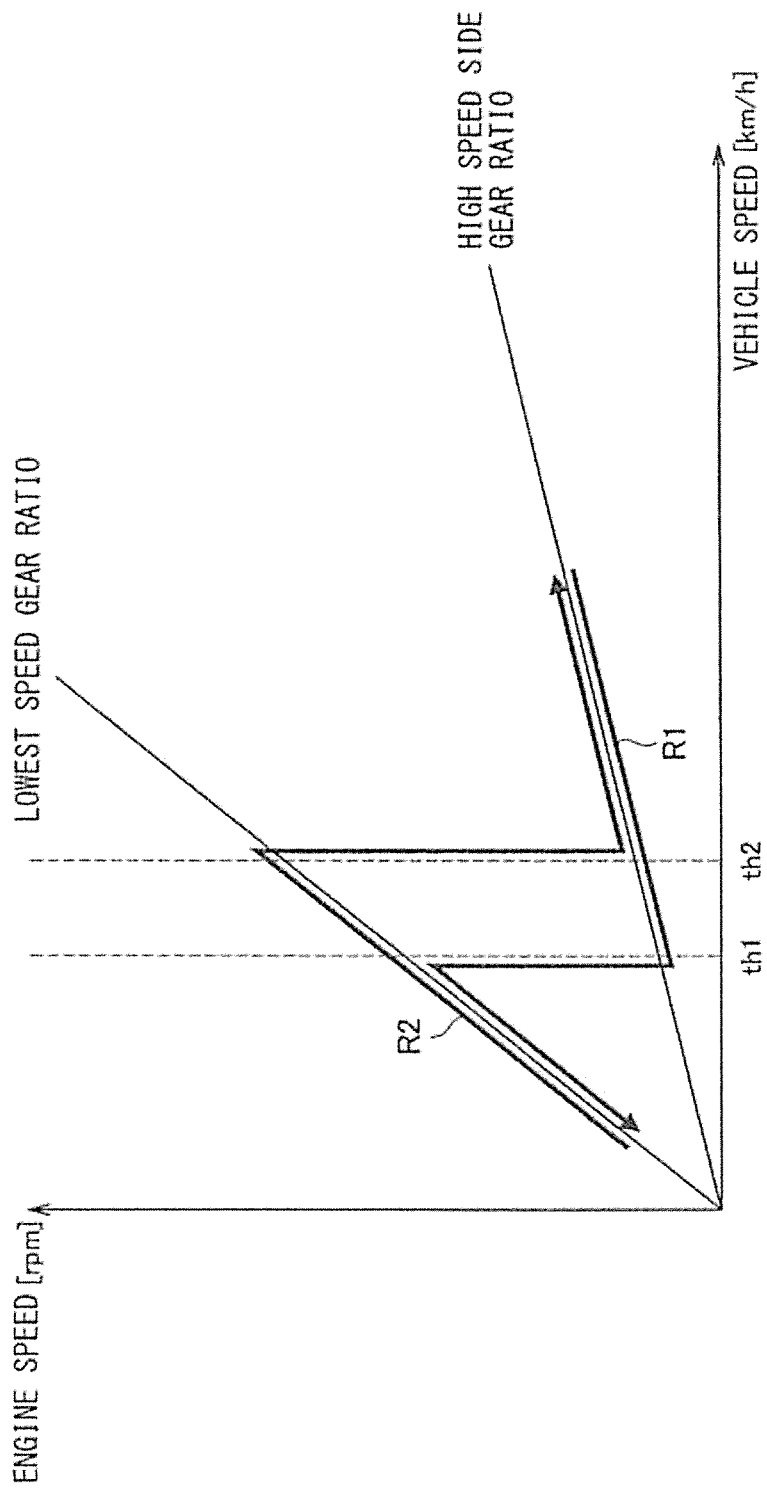
FIG. 6 is a view for describing how a gear ratio is adjusted in a first adjustment mode during execution of an EV travel mode, by the vehicle control apparatus illustrated in FIG. 1.

FIG. 6 is a view for describing how the gear ratio is adjusted in the first adjustment mode during execution of the EV travel mode.

The lowest speed gear ratio may correspond to a gear ratio at which a rate of change in engine speed is maximum with respect to the vehicle speed. On the other hand, the high speed side gear ratio may correspond to a gear ratio at which a rate of change in engine speed is smaller with respect to the vehicle speed. For example, the high speed side gear ratio may be a fastest speed gear ratio at which a rate of change in engine speed is minimum with respect to the vehicle speed, or a gear ratio around the fastest speed gear ratio.

For example, as the vehicle speed lowers in a state where the gear ratio is adjusted to a high speed side gear ratio, as illustrated by an arrow R1 in FIG. 6, the transmission controller 522 may keep the gear ratio at the high speed side gear ratio until the vehicle speed reaches a first threshold th1. As the vehicle speed lowers below the first threshold th1, the gear ratio may be adjusted to the lowest speed gear ratio. After that, as the vehicle speed increases in a state where the gear ratio is adjusted to the lowest speed gear ratio, as illustrated by an arrow R2 in FIG. 6, the transmission controller 522 may keep the gear ratio at the lowest speed gear ratio until the vehicle speed reaches a second threshold th2 greater than the first threshold th1. As the vehicle speed exceeds the second threshold th2, the gear ratio may be adjusted to a high speed side gear ratio.

As described above, the gear ratio of the CVT 23 may be adjusted in accordance with the vehicle speed in the first adjustment mode. It is therefore possible to suppress the vehicle from re-starting with power outputted from the engine 11 after the vehicle has come to a halt in a state where the gear ratio is too close to a high speed side. It is also possible to suppress the vehicle from re-accelerating with power outputted from the engine 11 by the travel mode being switched to the HEV travel mode in a state where the gear ratio is too close to the high speed side in a case where the vehicle speed is relatively low. This makes it possible to suppress a decrease in ease of start or in acceleration due to a lack of power to be transmitted to the drive wheels 97. It is also possible to suppress the travel mode from being switched to the HEV travel mode in a state where the gear ratio is too close to a low speed side in a case where the vehicle speed is relatively high. This makes it possible to suppress over rotation where the speed of the primary shaft 234 becomes excessive.

In a case where YES is determined at steps S501 and S503, the transmission controller 522 of the controller 52 may switch the adjustment mode for the gear ratio of the CVT 23 to the second adjustment mode at step S505.

In the second adjustment mode, the transmission controller 522 may adjust the gear ratio of the CVT 23 to the reference gear ratio smaller than the lowest speed gear ratio and keep the gear ratio at the reference gear ratio regardless of the vehicle speed. The second adjustment mode may correspond to an adjustment mode that suppresses the gear ratio from being adjusted more than necessary during execution of the EV travel mode in a case where the maximum allowable discharge electric power of the battery 33 is relatively great.

The reference gear ratio may be set as appropriate to a value that is able to appropriately suppress a decrease in ease of start when the vehicle re-starts or in acceleration when the vehicle re-accelerates with power outputted from the engine 11, as well as to appropriately suppress over rotation of the primary shaft 234, as will be described below. For example, the reference gear ratio may be set on the basis of specifications of the devices in the vehicle. In a specific but non-limiting example, the specifications may include, for example, output characteristics of the battery 33, output characteristics of the drive motor 31, and gear ratios of the gear trains or strength of the members, for example, in the power transmission system 1.

As described above, the gear ratio of the CVT 23 may be adjusted to the reference gear ratio in the second adjustment mode. The second adjustment mode may be an adjustment mode to be switched to in a case where the maximum allowable discharge electric power of the battery 33 is relatively great. In a state where the adjustment mode for the gear ratio has been switched to the second adjustment mode, it is thus possible in the drive motor 31 to output large power, compared with a state where the adjustment mode for the gear ratio has been switched to the first adjustment mode. Even though the gear ratio is adjusted to the reference gear ratio, i.e., the gear ratio is smaller than the lowest speed gear ratio, it is possible to use output of the drive motor 31 to compensate for a decrease in power outputted from the engine 11 and to be transmitted to the drive wheels 97 due to a decrease in the gear ratio when the vehicle re-starts or re-accelerates with power outputted from the engine 11. In such a case, it is therefore possible to suppress a lack of power to be transmitted to the drive wheels 97, making it possible to suppress a decrease in ease of start or in acceleration.

In the second adjustment mode, adjusting the gear ratio to the reference gear ratio makes it possible to adjust the gear ratio smaller than the lowest speed gear ratio. Even in a case where the travel mode has been switched to the HEV travel mode in a case where the vehicle speed is relatively high, it is therefore possible to suppress over rotation where the speed of the primary shaft 234 becomes excessive, compared with a case where the gear ratio is adjusted to the lowest speed gear ratio.

Furthermore, in the second adjustment mode, the gear ratio of the CVT 23 may be adjusted to and kept at the reference gear ratio regardless of the vehicle speed, achieving a state where no adjustment of the gear ratio takes place after the gear ratio has been adjusted to the reference gear ratio. In the second adjustment mode, it is therefore possible, in a state where the gear ratio is not adjusted, to appropriately suppress a decrease in ease of start when the vehicle re-starts or in acceleration when the vehicle re-accelerates with power outputted from the engine 11, as well to appropriately suppress over rotation of the primary shaft 234.

During execution of the EV travel mode, the gear ratio may be adjusted by engaging the output clutch 24, as described above. In a case where the gear ratio is adjusted during execution of the EV travel mode, an energy loss may thus be generated as at least the CVT 23 is rotated. In the control regarding an adjustment of the gear ratio of the CVT 23 during execution of the EV travel mode by the controller 52 according to the example embodiment, the adjustment mode for the gear ratio may be switched in accordance with a state of the battery 33 between the first adjustment mode and the second adjustment mode, as described above. This makes it possible to appropriately suppress, in both of the adjustment modes, i.e., the first adjustment mode and the second adjustment mode, a decrease in ease of start when the vehicle re-starts or in acceleration when the vehicle re-accelerates with power outputted from the engine 11, as well as to appropriately suppress over rotation of the primary shaft 234. This also makes it possible to achieve, in the second adjustment mode, such a state that the gear ratio will not be adjusted after the gear ratio has been adjusted to the reference gear ratio. This further makes it possible to suppress the gear ratio from being adjusted more than necessary during execution of the EV travel mode, making it possible to decrease frequency of adjustments of the gear ratio. It is therefore also possible to appropriately suppress a decrease in energy efficiency due to an adjustment of the gear ratio of the CVT 23 during execution of the EV travel mode.

In terms of more appropriately achieving both of an effect of suppressing a decrease in ease of start when the vehicle re-starts or in acceleration when the vehicle re-accelerates with power outputted from the engine 11, and an effect of suppressing over rotation of the primary shaft 234, the reference gear ratio in the second adjustment mode may be made greater than a high speed side gear ratio in the first adjustment mode. That is, the reference gear ratio may be made to be a gear ratio ranging between the lowest speed gear ratio and a high speed side gear ratio. The reference gear ratio may correspond to a high speed side gear ratio in the first adjustment mode, such as a fastest speed gear ratio.

The control flow illustrated in FIG. 5 may end after step S505 or S507.

In the control flow illustrated in FIG. 5, the adjustment mode for the gear ratio may be switched to the first adjustment mode in a case where NO is determined at step S501 or S503. The adjustment mode for the gear ratio may be switched to the second adjustment mode in a case where YES is determined at steps S501 and S503, as described above. In terms of appropriately switching the adjustment mode for the gear ratio in accordance with the maximum allowable discharge electric power of the battery 33, as described above, the transmission controller 522 may be allowed to be more likely to switch the adjustment mode for the gear ratio to the second adjustment mode during execution of the EV travel mode when the SOC of the battery 33 is greater. In terms of a similar reason as described above, the transmission controller 522 may be allowed to be more likely to switch the adjustment mode for the gear ratio to the second adjustment mode during execution of the EV travel mode when the temperature of the battery 33 is higher.

What triggers switching of the adjustment mode for the gear ratio is not particularly limited to the example described above. For example, either of steps S501 and S503 may be omitted from the control flow illustrated in FIG. 5. The transmission controller 522 may estimate the maximum allowable discharge electric power of the battery 33 on the basis of the SOC and the temperature of the battery 33. The transmission controller 522 may switch the adjustment mode for the gear ratio to the first adjustment mode in a case where the estimated value of the maximum allowable discharge electric power of the battery 33 is smaller than reference electric power. The transmission controller 522 may switch the adjustment mode for the gear ratio to the second adjustment mode in a case where the estimated value is equal to or above the reference electric power. For example, the reference electric power may be set to a value allowing a determination of whether the maximum allowable discharge electric power of the battery 33 satisfies power requested in the second adjustment mode.

3. EXAMPLE EFFECTS OF CONTROL APPARATUS

Next, example effects of the control apparatus 50 according to the example embodiment of the disclosure will be described below.

The control apparatus 50 according to the example embodiment may include the controller 52. The controller 52 may engage the output clutch 24 during execution of the EV travel mode to adjust the gear ratio of the CVT 23. During execution of the EV travel mode, the controller 52 may switch the adjustment mode for the gear ratio in accordance with the state of the battery 33 between the first adjustment mode and the second adjustment mode. The first adjustment mode may allow the gear ratio of the CVT 23 to be adjusted in accordance with the vehicle speed of the vehicle. The second adjustment mode may allow the gear ratio of the CVT 23 to be adjusted to the reference gear ratio smaller than the lowest speed gear ratio. The second adjustment mode may then keep the gear ratio of the CVT 23 at the reference gear ratio regardless of the vehicle speed. This makes it possible to appropriately suppress, in both of the adjustment modes, i.e., the first adjustment mode and the second adjustment mode, a decrease in ease of start when the vehicle re-starts or in acceleration when the vehicle re-accelerates with power outputted from the engine 11. This as well makes it possible to appropriately suppress over rotation of the primary shaft 234. This also makes it possible to achieve, in the second adjustment mode, such a state that the gear ratio will not be adjusted after the gear ratio has been adjusted to the reference gear ratio. This further makes it possible to suppress the gear ratio from being adjusted more than necessary during execution of the EV travel mode, making it possible to decrease frequency of adjustments of the gear ratio. It is therefore also possible to appropriately suppress a decrease in energy efficiency due to an adjustment of the gear ratio of the CVT 23 during execution of the EV travel mode.

In the control apparatus 50 according to the example embodiment, the controller 52 may be more likely to switch the adjustment mode for the gear ratio to the second adjustment mode in a case where the SOC of the battery 33 is greater during execution of the EV travel mode. This makes it possible to cause the adjustment mode for the gear ratio to be more likely to be switched to the second adjustment mode in a case where the maximum allowable discharge electric power of the battery 33 is greater. This further makes it possible to appropriately switch the adjustment mode for the gear ratio in accordance with the maximum allowable discharge electric power of the battery 33.

In the control apparatus 50 according to the example embodiment, the controller 52 may be more likely to switch the adjustment mode for the gear ratio to the second adjustment mode during execution of the EV travel mode when the temperature of the battery 33 is higher. This makes it possible to cause the adjustment mode for the gear ratio to be more likely to be switched to the second adjustment mode in a case where the maximum allowable discharge electric power of the battery 33 is greater. This further makes it possible to appropriately switch the adjustment mode for the gear ratio in accordance with the maximum allowable discharge electric power of the battery 33.

In the control apparatus 50 according to the example embodiment, the controller 52 may adjust, in the first adjustment mode, the gear ratio of the CVT 23 to the lowest speed gear ratio in a case where the vehicle speed has lowered below the first threshold. The controller 52 may adjust the gear ratio of the CVT 23 to a high speed side gear ratio in a case where the vehicle speed has exceeded the second threshold greater than the first threshold. It is therefore possible to more appropriately suppress the vehicle from re-starting with power outputted from the engine 11 after the vehicle has come to a halt in a state where the gear ratio is too close to the high speed side. It is also possible to more appropriately suppress the vehicle from re-accelerating with power outputted from the engine 11 by the travel mode being switched to the HEV travel mode in a state where the gear ratio is too close to the high speed side in a case where the vehicle speed is relatively low. This further makes it possible to more appropriately suppress the travel mode from being switched to the HEV travel mode in a state where the gear ratio is too close to the low speed side in a case where the vehicle speed is relatively high. It is therefore possible to more appropriately suppress a decrease in ease of start when the vehicle re-starts or a decrease in acceleration when the vehicle re-accelerates with power outputted from the engine 11, as well as to more appropriately suppress over rotation of the primary shaft 234.

In the control apparatus 50 according to the example embodiment, the reference gear ratio in the second adjustment mode may be made greater than a high speed side gear ratio in the first adjustment mode. That is, the reference gear ratio may be made to be a gear ratio ranging between the lowest speed gear ratio and a high speed side gear ratio. By making the reference gear ratio closer to the lowest speed gear ratio, it is possible to increase an effect of suppressing a decrease in ease of start when the vehicle re-starts or in acceleration when the vehicle re-accelerates with power outputted from the engine 11. On the other hand, by making the reference gear ratio closer to a high speed side gear ratio, it is possible to increase an effect of suppressing over rotation of the primary shaft 234. As described above, the effect of suppressing a decrease in ease of start when the vehicle re-starts or in acceleration when the vehicle re-accelerates with power outputted from the engine 11, and the effect of suppressing over rotation of the primary shaft 234 are in a trade-off relationship. By setting the reference gear ratio to a gear ratio ranging between the lowest speed gear ratio and a high speed side gear ratio, it is therefore possible to more appropriately satisfy both the effect of suppressing a decrease in ease of start when the vehicle re-starts or in acceleration when the vehicle re-accelerates with power outputted from the engine 11, and the effect of suppressing over rotation of the primary shaft 234.

4. CONCLUSION

As described above, the control apparatus 50 according to the example embodiment includes the controller 52 that engages the output clutch 24 during execution of the EV travel mode to adjust the gear ratio of the CVT 23. During execution of the EV travel mode, the controller 52 switches the adjustment mode for the gear ratio in accordance with the state of the battery 33 between the first adjustment mode and the second adjustment mode. The first adjustment mode allows the gear ratio of the CVT 23 to be adjusted in accordance with the vehicle speed of the vehicle. The second adjustment mode allows the gear ratio of the CVT 23 to be adjusted to and kept at the reference gear ratio smaller than the lowest speed gear ratio regardless of the vehicle speed. This makes it possible to appropriately suppress a decrease in ease of start when the vehicle re-starts or in acceleration when the vehicle re-accelerates with power outputted from the engine 11. This as well makes it possible to appropriately suppress over rotation of the primary shaft 234. This further makes it possible to suppress the gear ratio from being adjusted more than necessary during execution of the EV travel mode. It is therefore also possible to appropriately suppress a decrease in energy efficiency due to an adjustment of the gear ratio of the CVT 23 during execution of the EV travel mode.

Some example embodiments of the disclosure have been described in detail with reference to the accompanying drawings. However, the disclosure is not limited to the example embodiments. It is apparent that persons skilled in the technical field of the disclosure may perceive various modification examples or application examples within the scope of the technical concept as defined by the following claims. It should be appreciated that the various modification examples or application examples obviously fall within the technical scope of the disclosure.

For example, in the example described above, the power transmission system 1 may be provided, as a continuously variable transmission, with the CVT 23. The CVT 23 may be a chain CVT including the chain 233. A continuously variable transmission provided in the power transmission system 1 is not however limited to the example described above. For example, a continuously variable transmission provided in the power transmission system 1 may be a belt CVT including a belt as a member that transmits power. For example, a continuously variable transmission provided in the power transmission system 1 may be a toroidal CVT.

For example, in the configuration described above with reference to FIG. 1, the power transmission system 1 of the vehicle mounted with the control apparatus 50 is described. A power transmission system of the vehicle mounted with the control apparatus 50 is not however limited to the configuration described above as an example. A configuration may at least include an engine, a continuously variable transmission, a drive motor, an output clutch, and a battery. The configuration may have coupling relationships among the components equivalent to coupling relationships of the power transmission system 1 illustrated in FIG. 1. For example, such a power transmission system of a vehicle mounted with the control apparatus 50 may be used that some of the components of the power transmission system 1 illustrated in FIG. 1 are omitted, that an additional component is added to the power transmission system 1, or that a positional relationship between some of the components of the power transmission system 1 is partially changed.

For example, the processes described with reference to the flowchart in the present specification may not be necessarily executed in the order indicated in the flowchart. For example, the process at step S503 may be executed before the process at step S501 in the flowchart illustrated in FIG. 5. An additional processing step may be adopted. Some processing steps may be omitted.

The control apparatus 50 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control apparatus 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the control apparatus 50 illustrated in FIG. 2.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle control apparatus configured to control a vehicle provided with an engine including a first output shaft, a continuously variable transmission coupled to the first output shaft of the engine and including a second output shaft, a drive motor coupled to a drive wheel, an output clutch configured to allow and disallow transmission of power between the second output shaft of the continuously variable transmission, and the drive wheel and the drive motor, and a battery configured to store electric power to be supplied to the drive motor, the vehicle control apparatus comprising a controller configured to switch and execute either of
an electric vehicle (EV) travel mode that allows, in a state where the output clutch is disengaged, power outputted from the drive motor to drive the drive wheel, and
a hybrid electric vehicle (HEV) travel mode that allows, in a state where the output clutch is engaged, both power outputted from the engine and the power outputted from the drive motor to drive the drive wheel,
engage the output clutch during the execution of the EV travel mode to adjust a gear ratio of the continuously variable transmission, and
switch, during the execution of the EV travel mode, an adjustment mode for the gear ratio in accordance with a state of the battery between
a first adjustment mode that allows the gear ratio to be adjusted in accordance with a vehicle speed of the vehicle, and
a second adjustment mode that allows the gear ratio to be adjusted to a reference gear ratio smaller than a lowest speed gear ratio to keep the gear ratio at the reference gear ratio regardless of the vehicle speed.

2. The vehicle control apparatus according to claim 1, wherein the controller is configured to switch the adjustment mode for the gear ratio to the second adjustment mode in a case where a remaining capacity of the battery is greater than a threshold during the execution of the EV travel mode.

3. The vehicle control apparatus according to claim 1, wherein the controller is configured to switch the adjustment mode for the gear ratio to the second adjustment mode in a case where a temperature of the battery is higher than a threshold during the execution of the EV travel mode.

4. The vehicle control apparatus according to claim 2, wherein the controller is configured to switch the adjustment mode for the gear ratio to the second adjustment mode in a case where a temperature of the battery is higher than a threshold during the execution of the EV travel mode.

5. The vehicle control apparatus according to claim 1, wherein, in the first adjustment mode, the controller is configured to
adjust the gear ratio to the lowest speed gear ratio in a case where the vehicle speed has lowered below a first threshold, and
adjust the gear ratio to a high speed side gear ratio in a case where the vehicle speed has exceeded a second threshold greater than the first threshold.

6. The vehicle control apparatus according to claim 2, wherein, in the first adjustment mode, the controller is configured to
adjust the gear ratio to the lowest speed gear ratio in a case where the vehicle speed has lowered below a first threshold, and
adjust the gear ratio to a high speed side gear ratio in a case where the vehicle speed has exceeded a second threshold greater than the first threshold.

7. The vehicle control apparatus according to claim 3, wherein, in the first adjustment mode, the controller is configured to
adjust the gear ratio to the lowest speed gear ratio in a case where the vehicle speed has lowered below a first threshold, and
adjust the gear ratio to a high speed side gear ratio in a case where the vehicle speed has exceeded a second threshold greater than the first threshold.

8. The vehicle control apparatus according to claim 4, wherein, in the first adjustment mode, the controller is configured to
adjust the gear ratio to the lowest speed gear ratio in a case where the vehicle speed has lowered below a first threshold, and
adjust the gear ratio to a high speed side gear ratio in a case where the vehicle speed has exceeded a second threshold greater than the first threshold.

9. The vehicle control apparatus according to claim 5, wherein the reference gear ratio in the second adjustment mode is greater than the high speed side gear ratio in the first adjustment mode.

10. The vehicle control apparatus according to claim 6, wherein the reference gear ratio in the second adjustment mode is greater than the high speed side gear ratio in the first adjustment mode.

11. The vehicle control apparatus according to claim 7, wherein the reference gear ratio in the second adjustment mode is greater than the high speed side gear ratio in the first adjustment mode.

12. The vehicle control apparatus according to claim 8, wherein the reference gear ratio in the second adjustment mode is greater than the high speed side gear ratio in the first adjustment mode.

13. A vehicle control apparatus configured to control a vehicle provided with an engine including a first output shaft, a continuously variable transmission coupled to the first output shaft of the engine and including a second output shaft, a drive motor coupled to a drive wheel, an output clutch configured to allow and disallow transmission of power between the second output shaft of the continuously variable transmission, and the drive wheel and the drive motor, and a battery configured to store electric power to be supplied to the drive motor, the vehicle control apparatus comprising circuitry configured to switch and execute either of an electric vehicle (EV) travel mode that allows, in a state where the output clutch is disengaged, power outputted from the drive motor to drive the drive wheel, and a hybrid electric vehicle (HEV) travel mode that allows, in a state where the output clutch is engaged, both power outputted from the engine and the power outputted from the drive motor to drive the drive wheel, engage the output clutch during the execution of the EV travel mode to adjust a gear ratio of the continuously variable transmission, and switch, during the execution of the EV travel mode, an adjustment mode for the gear ratio in accordance with a state of the battery between a first adjustment mode that allows the gear ratio to be adjusted in accordance with a vehicle speed of the vehicle, and a second adjustment mode that allows the gear ratio to be adjusted to a reference gear ratio smaller than a lowest speed gear ratio to keep the gear ratio at the reference gear ratio regardless of the vehicle speed.

\* \* \* \* \*